(12) United States Patent
Laine et al.

(10) Patent No.: US 7,791,046 B2
(45) Date of Patent: Sep. 7, 2010

(54) HIGH EFFICIENCY FIBER-OPTIC SCINTILLATOR RADIATION DETECTOR

(75) Inventors: Juha-Pekka J. Laine, Boston, MA (US); Peter Miraglia, Weymouth, MA (US); H. Charles Tapalian, Jr., Seekonk, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 12/154,061

(22) Filed: May 20, 2008

(65) Prior Publication Data

US 2009/0289190 A1    Nov. 26, 2009

(51) Int. Cl.
 *G01J 1/58* (2006.01)
(52) U.S. Cl. .................................. 250/483.1
(58) Field of Classification Search ............... 250/483.1, 250/485.1
 See application file for complete search history.

(56) References Cited

U.S. PATENT DOCUMENTS

| | | | | |
|---|---|---|---|---|
| 4,788,436 A | * | 11/1988 | Koechner | 250/485.1 |
| 5,168,540 A | * | 12/1992 | Winn et al. | 385/128 |
| 5,588,084 A | * | 12/1996 | Johnson | 385/123 |
| 5,880,475 A | * | 3/1999 | Oka et al. | 250/483.1 |
| 6,310,352 B1 | * | 10/2001 | Gross et al. | 250/370.11 |
| 2004/0071433 A1 | * | 4/2004 | Sugihara | 385/144 |
| 2005/0111805 A1 | * | 5/2005 | Hertz et al. | 385/125 |

OTHER PUBLICATIONS

Borenstein et al., "A fine grained scitillating optical fiber hodoscope for use at Isabelle," 1981, IEEE Transaction on Nuclear Science, vol. NS-28, No. 1, pp. 458-460.*

* cited by examiner

*Primary Examiner*—David P Porta
*Assistant Examiner*—Kiho Kim
(74) *Attorney, Agent, or Firm*—Iandiorio Teska & Coleman (57) ABSTRACT

A fiber-optic scintillation radiation detector includes: a cladding; a core extending within the cladding; and a scintillator contiguous with the core within the cladding responsive to particle and/or photon radiation by providing scintillation photons, which are then primarily propagated in the core.

9 Claims, 8 Drawing Sheets

HIGH EFFICIENCY FIBER-OPTIC SCINTILLATOR RADIATION DETECTOR

FIELD OF THE INVENTION

This invention relates to an improved high efficiency fiber-optic scintillator radiation detector.

BACKGROUND OF THE INVENTION

Scintillating materials are commonly used in low-threshold radiation detectors. Such materials generate detectable light pulses as a result of interaction with specific types of particle or photon radiation. Recently, novel scintillating materials have been developed that can be drawn into optical fiber form. The light-guide property of the fiber collects scintillation light generated over the entire length of the fiber and delivers it to the fiber end facets. Current standard fiber-optic scintillators are made with a scintillator core surrounded by a cladding. An advantage of the "fiber-optic scintillator" detector is that it allows for the creation of relatively inexpensive, robust and versatile, large-area radiation detectors. The scintillating materials used in current fiber-optic detectors typically exhibit significant attenuation at the scintillation wavelengths: 1/e length of the order 2 meters. The high attenuation effectively limits the fiber sensor length. Radiation-induced scintillation is an isotropic process, launching photons in all directions at an equal likelihood. However, the light acceptance angle in a fiber-optic scintillator is limited by the total-internal-reflection (TIR) requirement. Typically, less than 5% of all scintillation light generated is captured by the fiber.

SUMMARY OF THE INVENTION

It is therefore an object of this invention to provide an improved high-efficiency fiber-optic scintillator radiation detector capable of detecting particle and/or photon radiation such as neutron and/or gamma.

It is a further object of this invention to provide such an improved high-efficiency fiber-optic scintillator which allows for more efficient collection and propagation of scintillation photons.

It is a further object of this invention to provide such an improved high-efficiency fiber-optic scintillator radiation detector which increases 1/e length and detection sensitivity, discrimination, energy resolution, positional uniformity, size of the effective detection area and reduced detection cost.

It is a further object of this invention to provide such an improved high-efficiency fiber-optic scintillator radiation detector which increases the scintillation photon acceptance angle and thus improves radiation detection sensitivity, discrimination and energy resolution.

The invention results from the realization that an improved fiber-optic scintillator radiation detector which more efficiently collects and propagates light, can be achieved by decoupling the core and scintillator with the scintillator contiguous with the core in the cladding and responsive to radiation for providing scintillation photons primarily propagated in the core.

The subject invention, however, in other embodiments, need not achieve all these objectives and the claims hereof should not be limited to structures or methods capable of achieving these objectives.

This invention features a fiber-optic scintillation radiation detector including: a cladding; a core extending within the cladding; and a scintillator contiguous with the core within the cladding responsive to particle and/or photon radiation by providing scintillation photons, which are then primarily propagated in the core.

In a preferred embodiment the core may be within the scintillator. The core and scintillator may be concentric. The scintillator and core may have approximately the same index of refraction and the cladding may have a lower index of refraction. The scintillator may have a higher refractive index than the core and the cladding may have a lower refractive index than the core. The scintillator may be within and eccentric to the core. The scintillator may have an index of refraction approximately equal to or less than that of the core and the cladding may have an index of refraction that is lower than both. The cladding may include a photonic crystal. The core may be within the scintillator and may be hollow. The scintillator may be within and eccentric to the core.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 1:
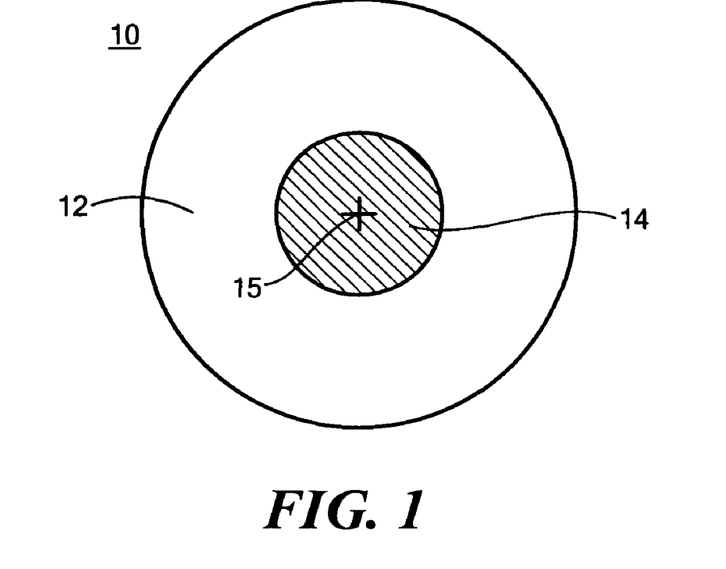
FIG. 1 is a schematic cross-sectional view of a conventional fiber-optic scintillator radiation detector with the scintillator in the core.
Figure 2:
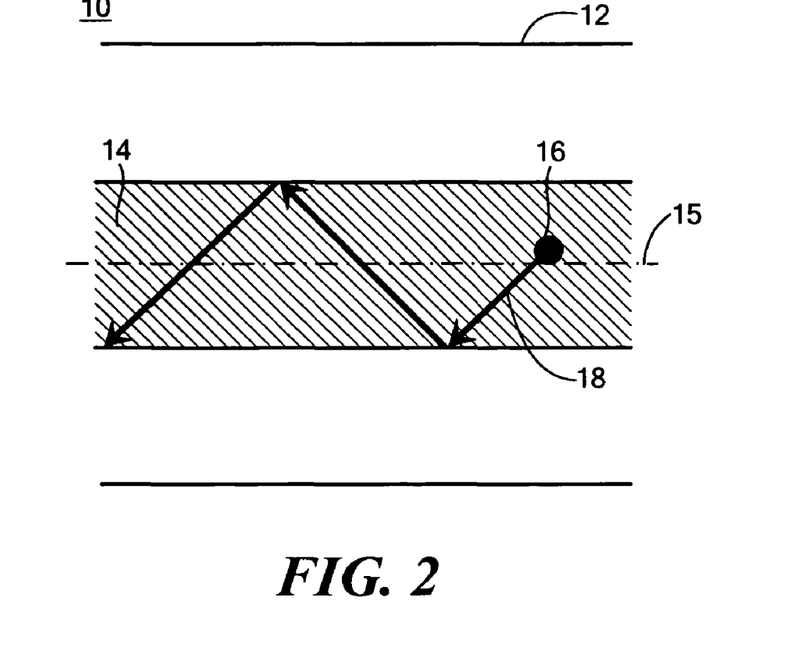
FIG. 2 is a side sectional ray diagram illustrating propagation of the scintillation photons (light) in the scintillator core of FIG. 1.

There is shown in FIG. 1 a prior art fiber-optic scintillator radiation detector 10 including a cladding 12 typically made of glass or polymer having an index of refraction $n_{cl}$. Inside of the cladding 12 is a combination core and scintillator 14 which couples the function of the scintillator and the core in one medium. Cladding 12 and core/scintillator 14 are concentric about center 15. The core/scintillator 14 responds to radiation, for example, neutron and/or gamma by producing scintillation photons, light, which is then propagated down the core and collected into light detectors placed at the fiber outputs. The scintillator core $n_{sc}$ typically has a higher refractive index than the cladding, $n_{sc} > n_{cl}$. The scintillator/core medium is typically glass or polymer doped with scintillating species, for example, lithium and cerium. The operation is shown in FIG. 2 where a photon 16 released by the scintillator medium propagates, 18, down the scintillator/core 14.

Figure 3:
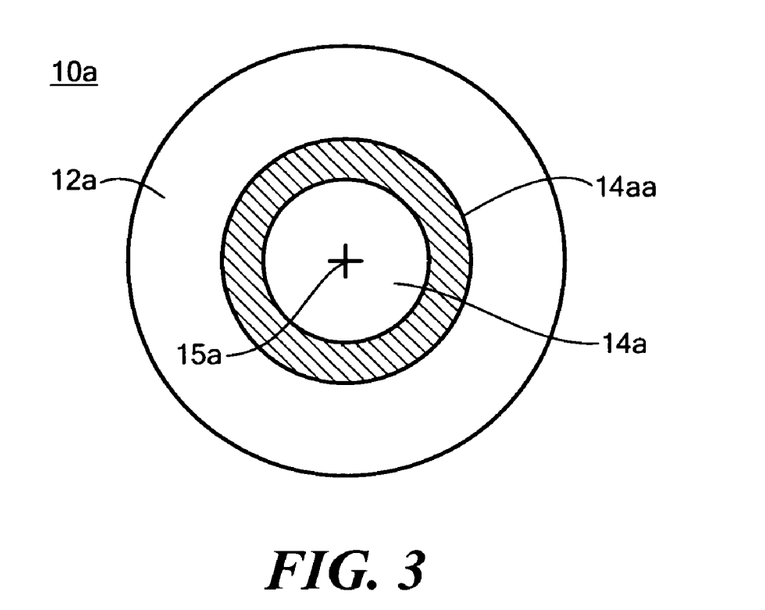
FIG. 3 is a schematic cross-sectional view of a fiber-optic scintillator radiation detector with decoupled contiguous core within the scintillator within the cladding according to this invention.
Figure 4:
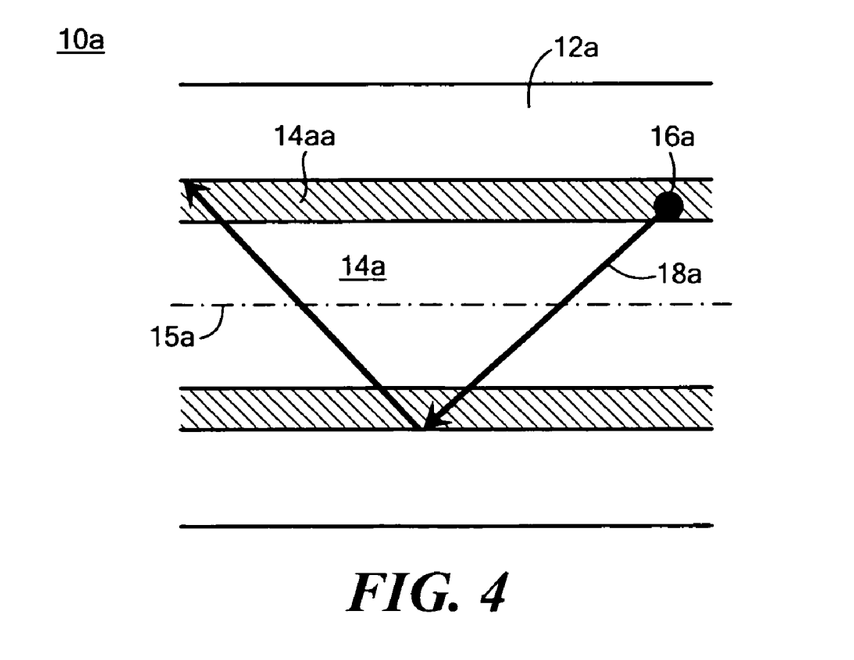
FIG. 4 is a side sectional ray diagram illustrating the improved propagation of the scintillator photons in the decoupled scintillator and core of FIG. 3.
Figure 5:
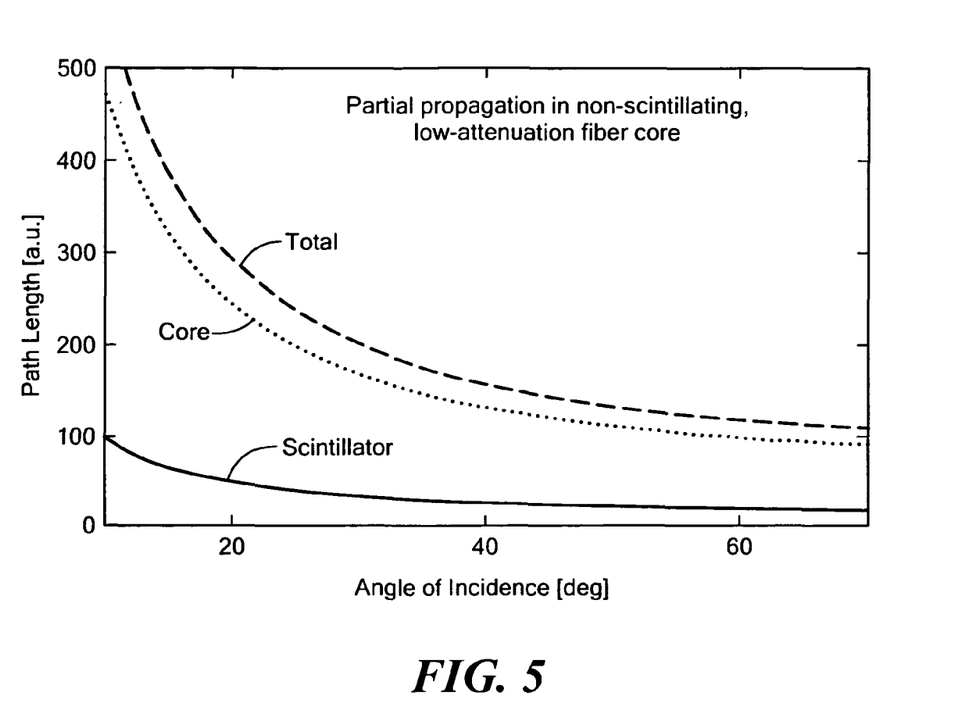
FIG. 5 is a plot showing path length variation with angle of incidence in the fiber-optic scintillator radiation detector of FIG. 3.

In accordance with this invention the core and scintillator are decoupled as shown in fiber-optics scintillator radiation detector 10a, FIG. 3, where the core 14a is typically glass or polymer having an index of refraction of $n_{co}$, whereas separate and decoupled from it is scintillator 14aa which is made of typical scintillator material having an index of refraction, $n_{sc}$, equal to or lower than $n_{co}$, but higher than $n_{cl}$. Here scintillator 14aa surrounds and is concentric with core 14a, all of which is surrounded by and concentric with cladding 12a, also made of glass or polymer typically having an index of refraction of $n_{cl}$. By decoupling the scintillator 14aa from the core 14a so the separate functions are performed by two different mediums there is a marked improvement in the propagation efficiency. For example, as shown in FIG. 4, the scintillator and inner core have an index of refraction which is approximately the same, $n_{sc} \approx n_{co}$ and the cladding 12a has a lower index of $n_{cl}$. Here it can be seen that a major portion of the propagation of the light rays 18a derived from scintillation event 16a travel in the core material 14a, such as silica which has a 1/e length of >100 meters as opposed to the scintillator medium 14aa, such as lithium/cerium doped glass or boron-loaded polymer which typically has a 1/e length of <4 meters. The improved performance is demonstrated in FIG. 5 where the scintillation photon path length in arbitrary units is shown as a function of the angle of incidence for a 0.5 mm thick scintillator layer surrounding a 5 mm non-scintillating low-attenuation core. There it can be seen that, at allowed angles of incidence the scintillation photon propagation path is mostly in the low-loss core—in this case at a ratio of 5 to 1. The partial propagation in a non-scintillating, low attenuation fiber core significantly increases the number of scintillation photons that reach the fiber outputs and this improves the performance and efficiency of the radiation detection process.

Figure 6:
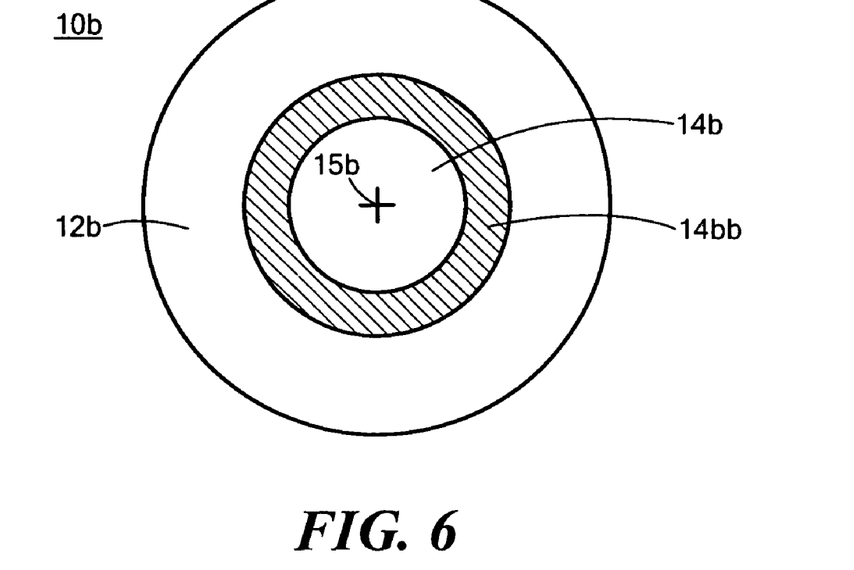
FIG. 6 is a view similar to FIG. 3 with a core having a reduced index of refraction.
Figure 7:
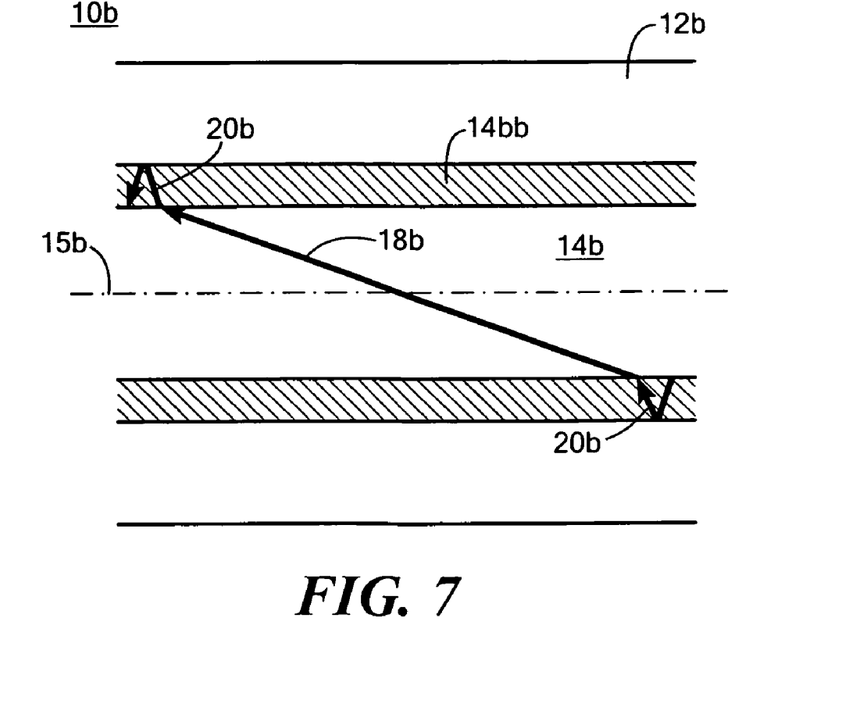
FIG. 7 is a side sectional ray diagram of the propagation of the scintillator photons in the core and scintillator of FIG. 6.
Figure 8:
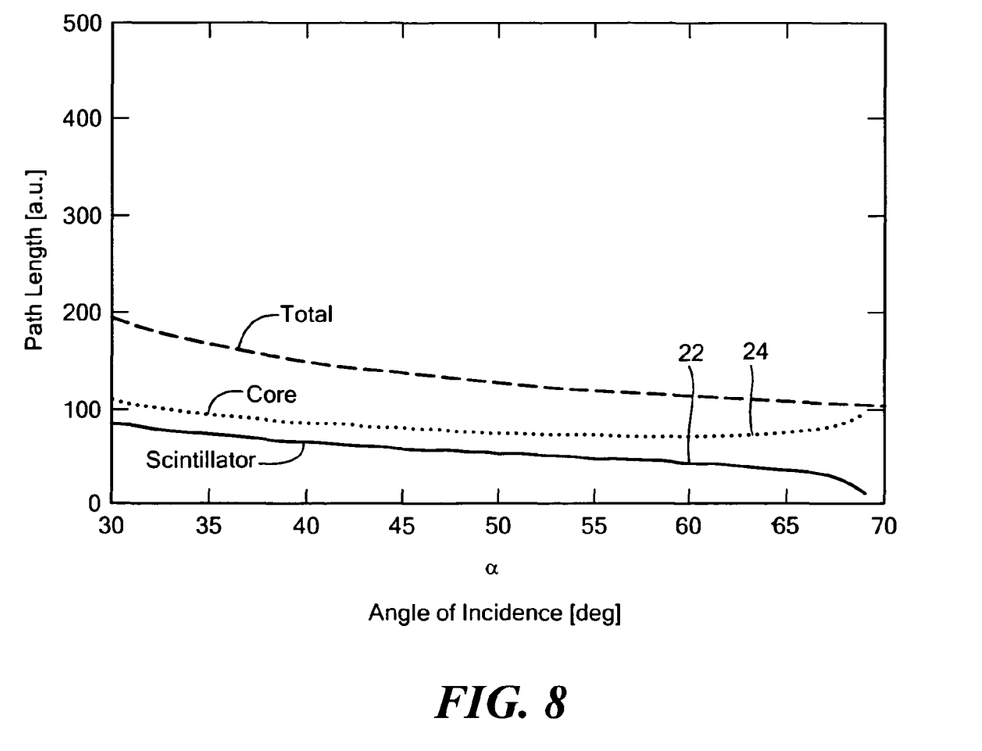
FIG. 8 is a plot showing path length variation with angle of incidence in the fiber-optic scintillator radiation detector of FIG. 6.

The performance can be further improved as shown in FIG. 6 by reducing the index of refraction of core 14b. Here with the scintillator 14bb index of refraction $n_{sc}$ being barely higher than the index of refraction $n_{co}$ of the core 14b and with the outer cladding having the lowest index of refraction $n_{cl}$ the ray schematic, FIG. 7, shows that the scintillation photon path 18b is even longer in the core 14b and refracts abruptly as at 20b in the scintillator 14bb. This provides an even more improved performance at specific propagation angles as shown by the plot in, FIG. 8, demonstrating the improved propagation in the core at common scintillation-photon launch angles for a scintillator with 2 mm thick scintillating layer and 5 mm core with a relative core index reduction of 0.09. Significantly, at the higher angles of incidence (for example 65°) the propagation in the scintillator falls off dramatically as shown at 22, while the propagation in the low-loss core increases as shown at 24.

Figure 9:
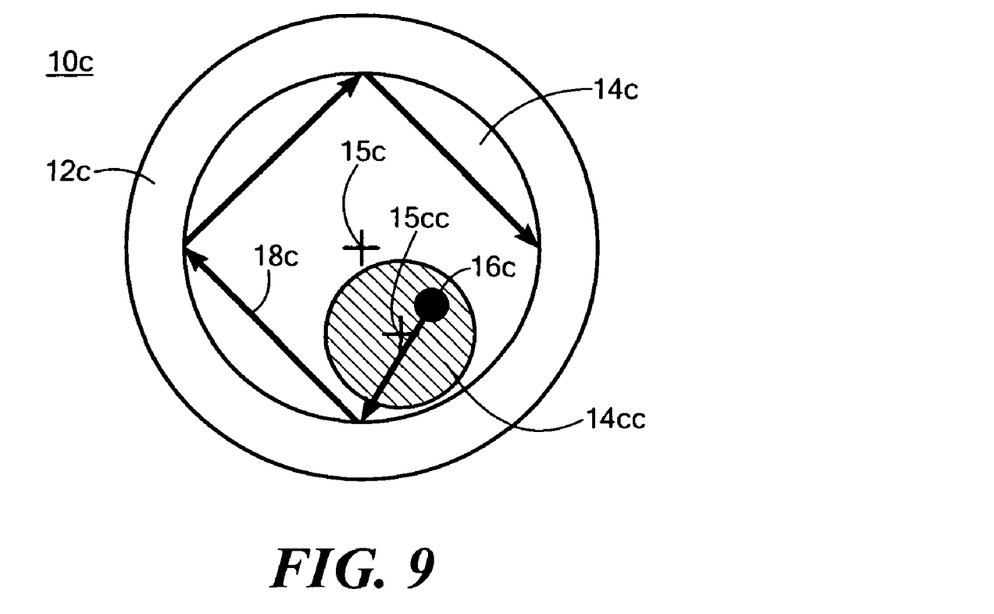
FIG. 9 is a view similar to FIGS. 3 and 6 with the scintillator eccentric to and within the core.
Figure 10:
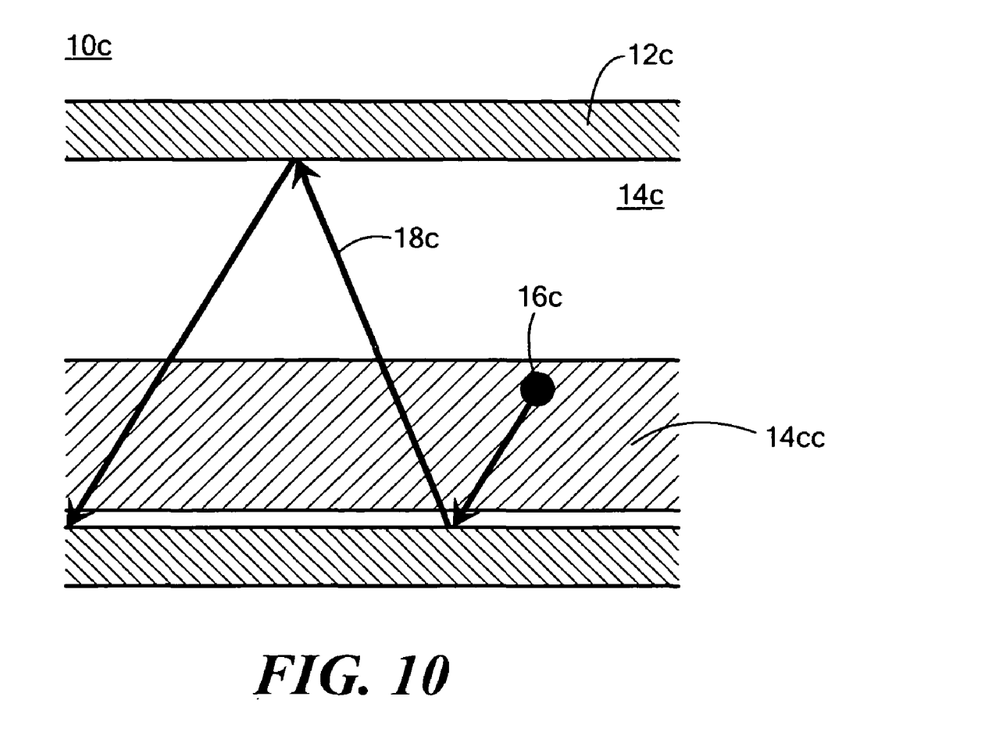
FIG. 10 is a side sectional ray diagram of the propagation of the scintillator photons in the core and scintillator of FIG. 9.

While thus far the decoupled core 14a, 14b and scintillator 14aa, 14bb, are shown concentric with each other and the cladding 12a, 12b, respectively, this is not a necessary limitation of the invention. That is, the scintillator 14cc, FIG. 9, may have its center 14cc eccentric to the center 15c of both core 14c and cladding 12c, here again the scintillator and the core may have a similar index of refraction n (for example 1.65) or the scintillator could be somewhat lower. The outer cladding 12c has a lower index of refraction than either core 14c or scintillator 14cc. Here again as shown in FIG. 10 the scintillation photon 18c propagates substantially in the core 14c as opposed to the scintillator 14cc.

Figure 11:
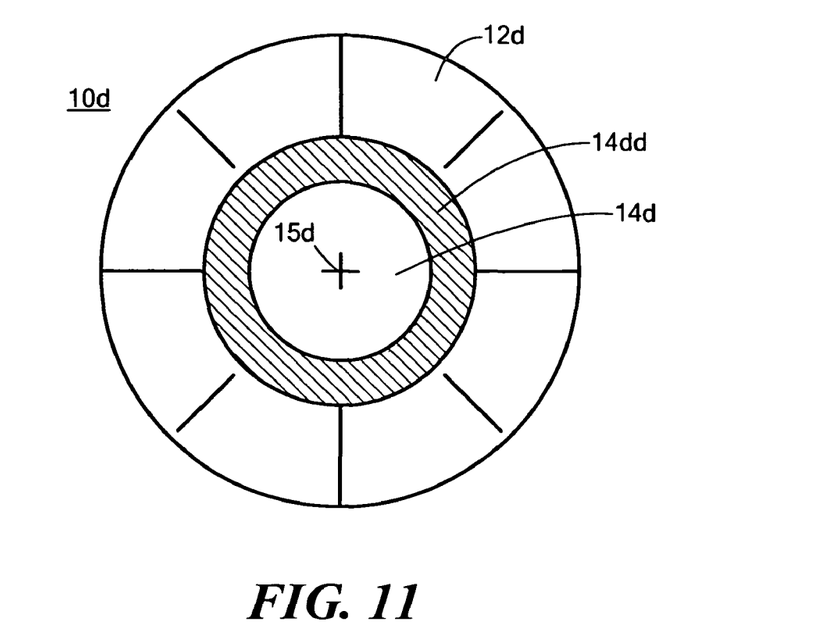
FIG. 11 is a view similar to FIGS. 3, 6, and 9 with a photonic crystal cladding and hollow core.
Figure 12:
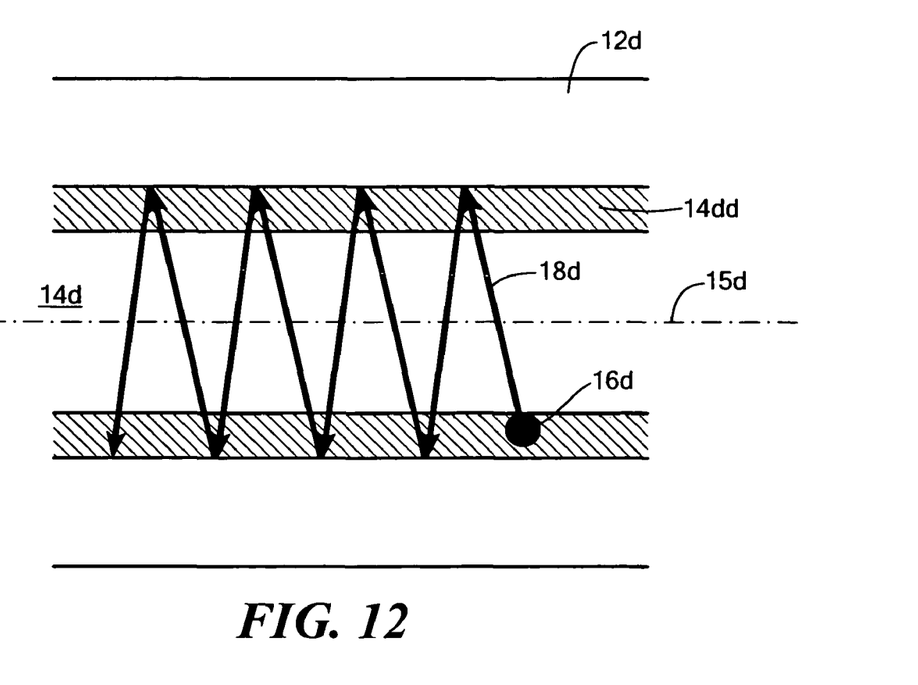
FIG. 12 is a side sectional ray diagram of the propagation of the scintillator photons in the core and scintillator of FIG. 11.
Figure 13:
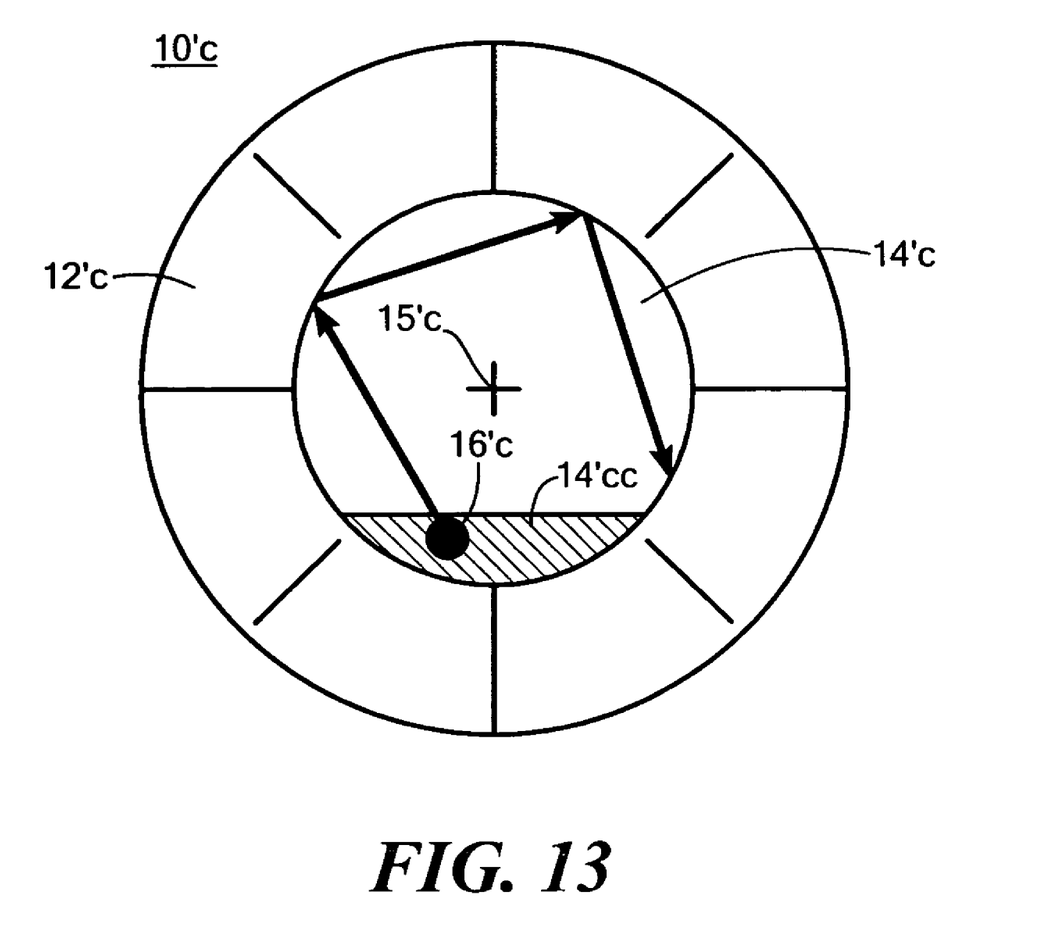
FIG. 13 is a side sectional view similar to FIGS. 3, 6, 9 and 11 illustrating eccentric scintillator placement in a hollow core.

The invention also contemplates using a photonic crystal hollow core light pipe 10d, FIG. 11 where the scintillator 14dd is eccentric to or surrounds a hollow core 14d which could be in vacuum or filled with gas mixture or fluid and the cladding 12d is actually a photonic-crystal structure, such as a multi-layer, lattice, or other band-gap structure which causes the light ray 18d, FIG. 12, to reflect sharply without reliance on the ratio of the indices of refraction but rather on the inherent nature of the photonic-crystal 12d wherein light scattered at the lattice elements interferes constructively outside of the crystal. The photonic-crystal could consist of material such as for example glass or polymer and the scintillator could once again be materials as mentioned earlier. The scintillating medium can be embedded in the photonic-crystal or it could be coated on the inside of the hollow-core photonic-crystal fiber or it may reside in the liquid/gaseous/solid form in the hollow core 14d. FIG. 13, where like reference numerals have been accompanied by a prime, shows eccentric scintillator placement in the hollow core.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A fiber-optic scintillator radiation detector comprising:
   a non-scintillating cladding having an index of refraction $n_{cl}$;
   a non-scintillating, low attenuation core having an index of refraction $n_{co}$ extending within said cladding; and a scintillator having an index of refraction $n_{sc}$ within and eccentric to said core and enclosed within said cladding responsive to particle and/or photon radiation by providing scintillation photons, which are then primarily propagated in said core, wherein $n_{cl}$ is less than $n_{co}$ and $n_{sc}$ and $n_{co}$ are approximately the same, or $n_{co}$ is greater than $n_{sc}$, the scintillator drawn within and eccentric to said core and enclosed within said cladding into a fiber optic form.

2. The fiber-optic scintillator radiation detector of claim 1 in which said core is within said scintillator.

3. The fiber-optic scintillator radiation detector of claim 2 in which said scintillator and core have approximately the same index of refraction and said cladding has a lower index of refraction.

4. The fiber-optic scintillator radiation detector of claim 2 in which said scintillator has a higher refractive index than said core and said cladding has a lower refractive index than said core.

5. The fiber-optic scintillator radiation detector of claim 2 in which said cladding includes a photonic crystal.

6. The fiber-optic scintillator radiation detector of claim 5 in which said core is within said scintillator and is hollow.

7. The fiber-optic scintillator radiation detector of claim 5 in which said scintillator is within and eccentric to said core.

8. The fiber-optic scintillator radiation detector of claim 1 in which said core and scintillator are concentric.

9. A fiber-optic passive scintillator radiation detector comprising:
- a non-scintillating cladding;
- a non-scintillating, low attenuation core extending within said cladding; and
- a scintillator contiguous with said core and enclosed within said cladding responsive to particle and/or photon radiation by providing scintillation photons which are then primarily propagated in said core,
- the scintillator drawn non-concentric with respect to both the core and the cladding into a fiber optic form.

* * * * *